(12) United States Patent  
Lin

(10) Patent No.: US 11,582,719 B2
(45) Date of Patent: Feb. 14, 2023

(54) ENHANCEMENT OF LOGICAL CHANNEL PRIORITIZATION FOR SIDELINK TRANSMISSION

(71) Applicant: MEDIATEK INC., Hsin-Chu (TW)

(72) Inventor: Guan-Yu Lin, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 249 days.

(21) Appl. No.: 17/008,485

(22) Filed: Aug. 31, 2020

(65) Prior Publication Data

US 2021/0105743 A1 Apr. 8, 2021

Related U.S. Application Data

(60) Provisional application No. 62/909,837, filed on Oct. 3, 2019.

(51) Int. Cl.
*H04W 72/02* (2009.01)
*H04W 72/10* (2009.01)
*H04W 28/02* (2009.01)
*H04W 4/40* (2018.01)
*H04W 92/18* (2009.01)

(52) U.S. Cl.
CPC .......... *H04W 72/02* (2013.01); *H04W 4/40* (2018.02); *H04W 28/0257* (2013.01); *H04W 28/0268* (2013.01); *H04W 72/10* (2013.01); *H04W 92/18* (2013.01)

(58) Field of Classification Search
CPC .............. H04W 4/40; H04W 28/0247; H04W 28/0257; H04W 28/0268; H04W 40/22; H04W 72/02; H04W 72/10; H04W 72/1242; H04W 92/18
See application file for complete search history.

(56) References Cited

U.S. PATENT DOCUMENTS

2019/0261376 A1* 8/2019 Li ........................ H04W 52/367
2020/0205209 A1* 6/2020 Pan ....................... H04W 76/14
2021/0051653 A1* 2/2021 Park ................... H04W 72/0413

* cited by examiner

*Primary Examiner* — Khoa Huynh
(74) *Attorney, Agent, or Firm* — Imperium Patent Works; Zheng Jin

(57) ABSTRACT

A method to prioritize sidelink logical channel (SL LCH) during destination UE selection for sidelink Logical Channel Prioritization (LCP) procedure in NR sidelink communication is proposed to avoid resource starvation. A TX UE prioritizes an RX UE having at least one SL LCH that has not satisfied a required minimum bit rate during destination UE selection when allocating SL resource to a new MAC PDU for SL transmission. The TX UE maintains a value Bj for each SL LCH j, where Bj>0 indicates that the logical channel has not met the requirement of prioritized bit rate. If at least one destination UE has SL LCH with data available for transmission and with Bj>0, then the selected destination UE is the one has the highest-priority SL LCH with data available for transmission and with Bj>0.

20 Claims, 4 Drawing Sheets

| Destination UE | SL LCH ID | SL LCH priority | Bj | With data? |
|---|---|---|---|---|
| 1 | 1 | 1 | <0 | Y |
|  | 2 | 2 | - | N |
|  | 3 | 3 | >0 | Y |
| 2 | 1 | 1 | - | N |
|  | 2 | 2 | >0 | Y |

# ENHANCEMENT OF LOGICAL CHANNEL PRIORITIZATION FOR SIDELINK TRANSMISSION

CROSS REFERENCE TO RELATED APPLICATIONS

This application claims priority under 35 U.S.C. § 119 from U.S. Provisional Application No. 62/909,837, entitled "Enhancement of Logical Channel Prioritization for Sidelink Transmission," filed on Oct. 3, 2019, the subject matter of which is incorporated herein by reference.

TECHNICAL FIELD

The disclosed embodiments relate generally to wireless network communications, and, more particularly, to logical channel prioritization (LCP) procedure enhancement for sidelink transmission in 5G new radio (NR) vehicle-to-everything (V2X) wireless communications systems.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. An established communication protocol such as 4G LTE and 5G New Radio (NR) can be used over the licensed spectrum to provide a first communication link, and LTE/NR can also be used over the unlicensed spectrum to provide a second communication link. In New Radio-Unlicensed (NR-U), any downlink and uplink access have to follow the listen-before-talk (LBT) channel access procedure, as unlicensed frequencies are also used by other networks such as WiFi.

For in-coverage UEs, a base station can schedule the data traffic over Uu link. For out-of-coverage UEs, UE can schedule the data traffic over PC5 (or sidelink). As compared to WiFi and NR unlicensed spectrum operation, a PC5 link (or sidelink) based mobile device potentially possesses the following features: 1) deployment by both operator can user; 2) operation in both unlicensed spectrum and licensed spectrum; 3) similar protocol stacks complexity to WiFi; 4) better multiplexing efficiency than WiFi; 5) better mobility support than WiFi, e.g., service continuity; 6) larger maximal TX power than WiFi for larger coverage: 7) support multi-hop relay.

There are potential problems in the current LTE vehicle-to-everything (V2X) design utilizing sidelink transmission. First, there may be resource starvation among destination UEs. In LTE V2X, a transmitter UE always selects the destination UE with the highest-priority sidelink logical channel (SL LCH) with data available for transmission among multiple receiver UEs. However, if such LTE V2X design for destination UE selection is directly applied, there is a problem of resource starvation among destination UEs. That is, a destination UE with a highest-priority SL LCH can always occupy the whole MAC PDU (SL grant) of the transmitter UE regardless of how much SL data the transmitter UE had sent for the high-priority SL LCH in previous MAC PDUs. This means other destination UEs without the highest-priority SL LCH cannot be scheduled by the transmitter UE with any SL transmission (i.e. resource starvation) until the transmitter UE has transmitted all the data of the highest-priority SL LCH. Second, diverse communication range is not yet supported. In NR V2X, diverse V2X applications are supported. Based on the applications different minimum communication ranges are supported. If UE is configured with a huge SL grant, due to power limitation in sidelink, UE may not able to send the large SL grant with a wide coverage. In other words, for some V2X applications requiring a large communication range (i.e. wide coverage), the applicable SL grant cannot be too large, i.e. a limit is needed to ensure the minimum communication range is satisfied. Currently, the restriction is not yet considered in the procedure for SL resource allocation. Third, there are issues of Hybrid Automatic Repeat reQuest (HARQ) collision. In mixed mode operation, both NW and UE can select SL resource for transmission. Each new SL grant transmission is associated with a HARQ process for new transmission and retransmission. Since there is no coordination between NW and UE scheduler, it is possible that NW and UE perform SL transmission for the same destination UE and the same HARQ process ID. It is not clear how to handle the case of HARQ collision.

A solution is sought.

SUMMARY

A method to prioritize sidelink logical channel (SL LCH) during destination UE selection for sidelink Logical Channel Prioritization (LCP) procedure in NR SL communication is proposed to avoid resource starvation. A TX UE prioritizes an RX UE having at least one SL LCH that has not satisfied a required minimum bit rate during destination UE selection when allocating SL resource to a new MAC PDU for SL transmission. The TX UE maintains a value Bj for each SL LCH j, where Bj>0 indicates that the logical channel has not met the requirement of prioritized bit rate. If at least one destination UE has SL LCH with data available for transmission and with Bj>0, then the selected destination UE is the one with the highest-priority SL LCH with data available for transmission and with Bj>0; otherwise, the selected destination UE is the one with the highest-priority SL LCH with data available for transmission (i.e., with Bj<=0).

In one embodiment, a transmitter user equipment (UE) establishes a plurality sidelink logical channels (SL LCHs) for new radio (NR) SL communication. The plurality of SL LCHs stores SL data to be transmitted to multiple receiver UEs. The transmitter UE maintains an indicator for each SL LCH of each receiver UE. Each indicator indicates whether a corresponding SL LCH with available SL data has met a minimum required bit rate to guarantee a QoS requirement for the corresponding SL LCH. The transmitter UE selects a destination UE from the multiple receiver UEs based on both the indicator value and an SL LCH priority of each SL LCH of each receiver UE. The transmitter UE transmits a MAC PDU over SL resource to the selected destination UE. The SL resource is allocated to construct the MAC PDU by multiplexing SL data from different SL LCHs of the selected destination UE.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
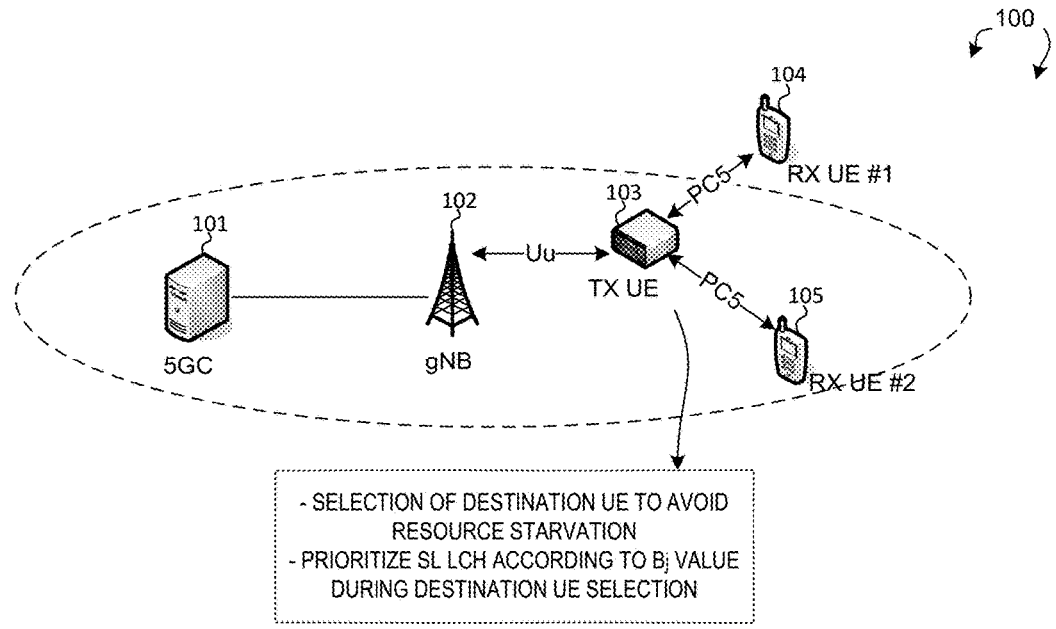
FIG. 1 illustrates a wireless communications system supporting enhancement of logical channel prioritization (LCP) for sidelink in accordance with a novel aspect.

FIG. 1 illustrates a wireless communications system 100 supporting enhancement of logical channel prioritization (LCP) for sidelink in accordance with a novel aspect. 5G new radio (NR) mobile communication network 100 comprises a 5G core (5GC) 101, a base station gNodeB 102, and a plurality of user equipments UE 103, UE 104, and UE 105. For in-coverage UEs, e.g., UE 103, a base station can schedule sidelink resource over Uu link for UE to perform sidelink communication (i.e. network scheduling); or, in another resource allocation mode, a UE can select sidelink resource for transmission by itself (i.e. UE autonomous scheduling). For out-of-coverage UEs, e.g., UE 104, since the scheduling from base station is not available, UE can only select resource for sidelink communication by itself.

In LTE and new radio (NR) networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI). The DCI format is a predefined format in which the downlink control information is formed and transmitted in PDCCH. Similarly, Physical Sidelink Control Channel (PSCCH) is used for sidelink (SL) scheduling of Physical Sidelink Shared Channel (PSSCH) transmission. The sidelink scheduling information carried by PSCCH is referred to as sidelink control information (SCI). SCI is transmitted over sidelink from TX UE to RX UE. The SCI format is a predefined format in which the sidelink control information is formed and transmitted in PSCCH. Both DCI format and SCI format give the UE scheduling details such as number of resource blocks, resource allocation type, modulation scheme, transport block, redundancy version, coding rate etc.

When a TX UE creates a MAC PDU to transmit using the allocated radio resources, the TX UE satisfies the QoS of each configured radio bearer. The TX UE has to decide on the amount of data for each logical channel (LCH) to be included in the MAC PDU. In constructing the MAC PDU with data from multiple LCHs, the data from the highest priority LCH are served first in the MAC PDU, followed by data from the next highest priority LCH, continuing until the MAC PDU space runs out. In LTE, a Prioritized Bit Rate (PBR) is defined for each LCH, to transmit data in order of importance but also to avoid starvation of data with low priority. The PBR is the minimum data rate guaranteed for the LCH. Even if a logical channel has a low priority, at least a small amount of MAC PDU space is allocated for it to guarantee the PBR of this low-priority logical channel. In a traditional Logical Channel Prioritization (LCP) procedure in NR Uu, each LCH j has a value Bj, which is increased by PBR * elapsed time since the last Bj update. The legacy LCP procedure of resource allocation for SL LCH includes two rounds: First round—allocate resource to satisfy Bj based on decreasing priority order (from high-priority SL LCH to low-priority SL LCH); and Second round—allocate resource to clean all remaining data from based on decreasing priority order until SL resource of this SL grant is exhausted or until no SL LCH has remaining data. SL LCHs configured with equal priority should be served equally.

In LTE vehicle-to-everything (V2X), a UE is configured with one of two resource allocation mode, i.e. the transmission resource is scheduled by the network (NW) or is selected by UE itself. In NR V2X, a UE is capable of handle two resource allocation mode simultaneously. That is, UE can use NW-scheduled resource for (re)transmission and at the same time perform other transmission based on the resource selected by UE itself (e.g. randomly select resource from a resource pool configured by NW). In LTE V2X, a transmitter UE needs to transmit SL data to multiple receiver UEs and thus needs to select a destination UE when constructing a new MAC PDU. Typically, the destination UE is selected in LTE V2X by comparing the highest priority of SL LCH with data available for transmission. However, if such legacy LTE V2X design for destination UE selection is directly applied in NR V2X design, there is a problem of resource starvation among destination UEs. That is, a destination UE with a high-priority SL LCH can always occupy the whole new MAC PDU regardless of how much SL data of the high-priority SL LCH is already transmitted in previous MAC PDUs.

In accordance with one novel aspect, a method to prioritize sidelink logical channel (SL LCH) during destination UE selection for Logical Channel Prioritization (LCP) procedure in NR vehicle-to-everything (V2X) is proposed to avoid resource starvation. In the example of FIG. 1, UE 103 is a transmitter (TX) UE for transmitting a MAC PDU over SL resource, and UE 104 and UE 105 are receiver (RX) UEs. TX UE 103 prioritize SL LCH according to Bj value during destination UE selection when constructing the MAC PDU. In a first example, SL LCH with Bj>Bth prioritized over SL LCH with Bj<=Bth. In a second example, SL LCH with Bj>=Bth is prioritized over SL LCH with Bj<Bth. Bth is an arbitrary value or a positive value or a non-negative value that can be configured per UE or per SL LCH. In general, indicator Bj>0 indicates that the LCH has not met the minimum required bit rate, and thus UE having at least one SL LCH with Bj>0 is prioritized over UE having no SL LCH with Bj>0. For example, if at least one UE has SL LCH with data available for transmission and with Bj>0, the destination UE is the one with the highest-priority SL LCH with data available for transmission and with Bj>0; otherwise, the destination UE is the one with the highest-priority SL LCH with data available for transmission.

Figure 2:
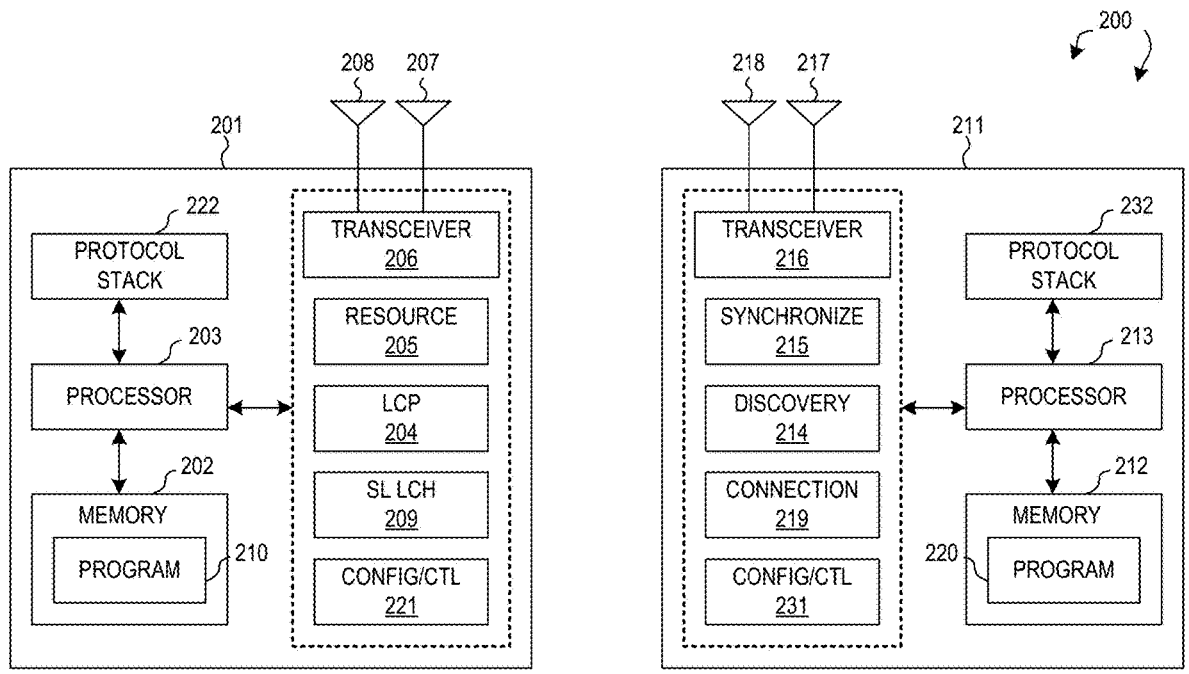
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station or a relay UE), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay or TX UE that includes a protocol stack 222, a resource management circuit 205 for allocating and scheduling sidelink resource, an LCP handling module 204 for performing SL LCP with destination UE selection, a connection handling circuit 209 for establish sidelink connections and logical channels with remote UEs, and a control and configuration circuit 221 for providing control and configuration information. Wireless device 211 is a remote or RX UE that includes a protocol stack 232, a synchronization handling circuit 215, a relay discovery circuit 214 for discovering relay UEs, a connection handling circuit 219 for establishing sidelink connections, and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention accordingly. In one example, UE 201 is a TX UE that performs sidelink LCP procedure for sidelink transmission via LCP handling module 204. The transmitter UE selects the destination UE with highest-priority SL LCH with indicator Bj>0 (i.e., has not met the minimum required bit rate) among all receiver UEs.

Figures 3, 4:
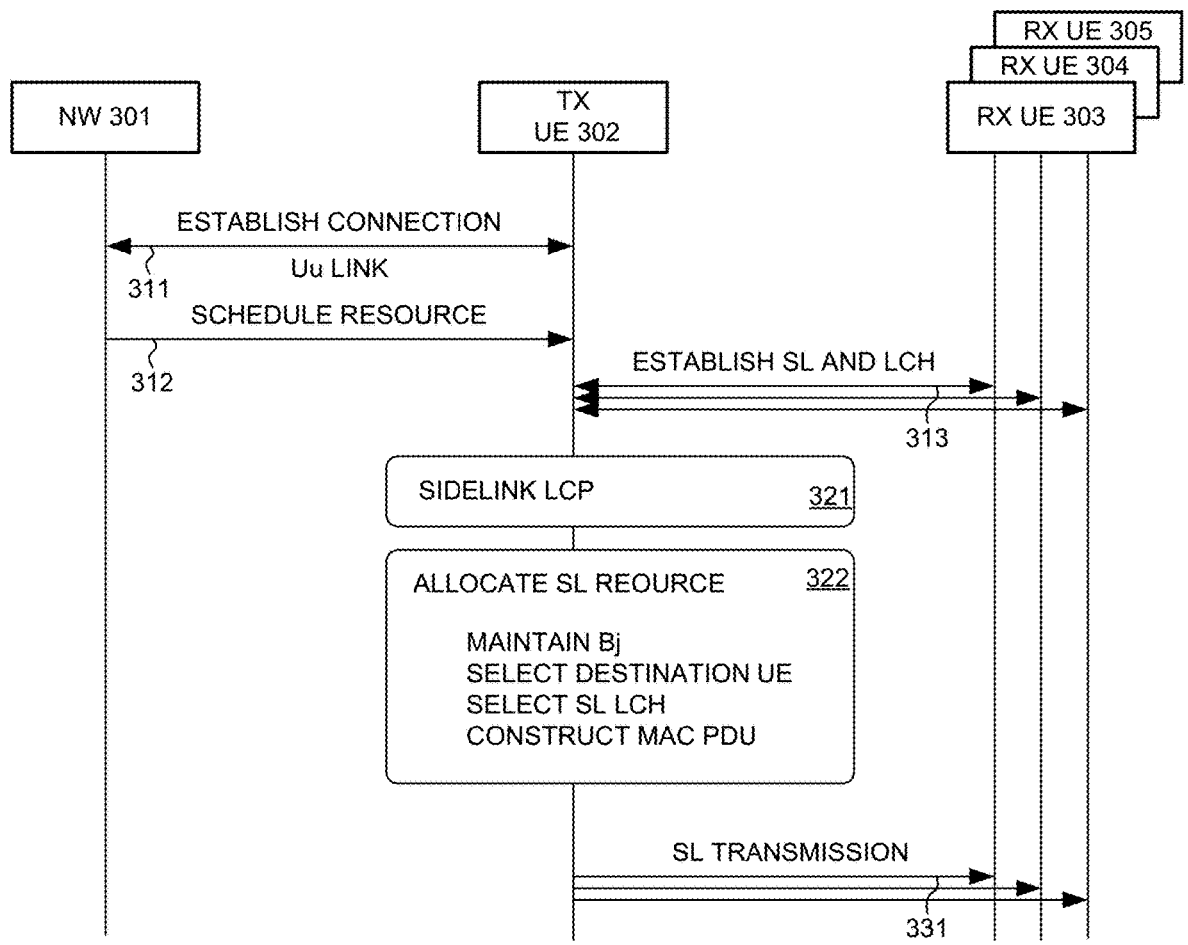
FIG. 3 illustrates a sequence flow between network and transmit and receiver UEs for logical channel prioritization (LCP) procedure enhancement in accordance with one novel aspect.
FIG. 4 illustrates a first embodiment of destination UE selection during LCP procedure in accordance with one novel aspect.

FIG. 3 illustrates a sequence flow between network 301 and transmit TX UE 302 and receive RX UEs 303-305 for logical channel prioritization (LCP) procedure enhancement in accordance with one novel aspect. In step 311, the network 301 establishes a connection with TX UE 302 over Uu link. In step 312, TX UE 302 receives various broadcast and unicast information from the network, including scheduling information and resource allocation. Note that a base station can schedule sidelink resource over Uu link for UE to perform sidelink communication (i.e. network scheduling). Alternatively, a UE can select sidelink resource for transmission by itself (i.e. UE autonomous scheduling) for V2X. In step 313, TX UE 302 establishes PC5-RRC connection with other RX UEs 303-305. Note that if a TX UE is performing broadcasting for V2X, then the TX UE does not need not build any SL connection with the RX UE before the TX UE sends data. For V2X communication and QoS management, multiple sidelink radio bearers (SL RBs) can be established, and each SL RB is mapped to a distinct sidelink logical channel (SL LCH). In addition, each SL RB is mapped to one or more QoS flows that define the QoS requirement for the SL LCH. One of the QoS requirements includes a minimum required bit rate, or a prioritized bit rate (PBR) for each SL LCH.

The sidelink Logical Channel Prioritization (LCP) procedure is applied whenever a new transmission is performed. RRC layer signaling controls the scheduling of sidelink data by signalling for each logical channel: sl-Priority where an increasing priority value indicates a lower priority level; sl-PrioritisedBitRate which sets the sidelink Prioritized Bit Rate (sPBR); and sl-BucketSizeDuration which sets the sidelink Bucket Size Duration (sBSD). RRC layer signaling additionally controls the LCP procedure by configuring mapping restrictions for each logical channel: sl-configured-SLGrantType1Allowed which sets whether a configured grant Type 1 can be used for sidelink transmission; and sl-allowedCG-List which sets the allowed configured grant(s) for sidelink transmission. UE variable Bj which is maintained at the TX UE side for each logical channel j and used for the logical channel prioritization procedure.

In step 321, TX UE 302 performs sidelink LCP procedure for the new transmission. In NR V2X, when the new transmission is performed by the TX UE to multiple RX UEs over sidelinks, TX UE 302 needs to construct a new MAC PDU from the different logical channels of each of the RX UEs. Therefore, before the LCP procedure that allocates resources based on LCH priority to satisfy QoS requirement, the TX UE also needs to select a destination UE among the RX UEs for sidelink resource allocation. Typically, the destination UE is selected in LTE V2X by comparing the highest priority of SL LCH with data available for transmission among multiple receiver UEs. However, there is a problem of resource starvation among destination UEs. That is, a destination UE with the highest-priority SL LCH can always occupy the whole new MAC PDU (the SL grant) of the transmitter UE, regardless of how much SL data the transmitter UE had sent for the highest-priority SL LCH in previous MAC PDUs.

In accordance with one novel aspect, in step 322, an enhanced sidelink LCP procedure is performed by UE 302 with destination UE selection to avoid resource starvation among RX UEs. Specifically, the enhanced sidelink LCP procedure involves the following steps. First, TX UE 302 maintains a variable Bj value for each logical channel j for each RX UE. Second, TX UE 302 selects a destination UE among the RX UEs based on the maintained Bj. Third, TX UE 302 selects a sidelink LCH from the selected destination UE for resource allocation. Finally, TX UE 302 construct the MAC PDU based on the destination UE selection and the sidelink LCH resource allocation. In step 331, TX UE 302 transmits the constructed MAC PDU to RX UEs 303-305 over sidelink transmission.

The variables Bj are maintained by the TX UE for each logical channel j for each RX UE as follows:

$$Bj = \min(Bj + sPRB \times T, \text{bucket size})$$

$$Bj = Bj - \text{scheduled data}$$

Specifically, the MAC entity in the TX UE initializes the Bj of the logical channel to zero when the logical channel is established. For each logical channel j, the MAC entity increments Bj by the product sPRB×T before every instance of the LCP procedure, where sPRB is the sidelink prioritized bit rate and T is the time elapsed since Bj was last incremented. If the value of Bj is greater than the sidelink bucket size (i.e. sPBR×sBSD), then set Bj to the sidelink bucket size. Note that the exact moment(s) when the UE updates Bj between LCP procedures is up to UE implementation, as long as Bj is up to date at the time when a grant is processed by LCP. After data has been scheduled, then Bj=Bj–scheduled data. In general, the value of Bj indicates whether LCH j has met the required minimum bit rate to guarantee QoS requirement. If Bj>0, it indicates that the SL LCH j has not yet satisfied the required minimum bit rate; and if Bj<=0, it indicates that the SL LCH j has met the required minimum bit rate.

Based on the maintained Bj values, TX UE 302 can perform the selection for destination UE accordingly. TX UE 302 prioritize SL LCH according to Bj value during destination UE selection when constructing the MAC PDU. In general, SL LCH with Bj>Bth is prioritized over SL LCH with Bj<=Bth. Alternatively, SL LCH with Bj>=Bth is prioritized over SL LCH with Bj<Bth. Note that Bth is an arbitrary value or a positive value or a non-negative value that can be configured per UE or per SL LCH. A destination UE is selected if the destination UE has the logical channel with the highest priority among the logical channels that satisfy all the following conditions: 1) SL data is available for transmission; 2) Bj>0, in case there is any logical channel having Bj>0; and 3) sl-configuredSLGrantType1Allowed, if configured, is set to true in case the SL grant is a Configured Grant Type 1. For example, if at least one destination UE has SL LCH with data available for transmission and with Bj>0, then the destination UE is the one with the highest-priority SL LCH with data available for transmission and with Bj>0; otherwise, the destination UE is the one with the highest-priority SL LCH with data available for transmission (i.e., with Bj<=0).

FIG. 4 table 400 illustrates a first embodiment of destination UE selection during LCP procedure in accordance with one novel aspect. In the example of FIG. 4, a transmitter UE has two destination UEs: UE1 and UE2. Toward UE 1, the transmitter UE has three sidelink logical channels LCH1, LCH2, and LCH3 having SL LCH priority of 1, 2, and 3, respectively. Toward UE2, the transmitter UE has two logical channels LCH1 and LCH2 having SL LCH priority of 1 and 2 respectively. During the destination UE selection, SL LCH will be classified into Bj>0 and Bj<0. SL LCH with Bj>0 is prioritized over SL LCH with Bj<0. Therefore, the first category priority group (Bj>0) includes UE1's LCH3 having SL LCH priority=3, and UE2's LCH2 having SL LCH priority=2. The second category priority group (Bj<0) includes UE1's LCH1 having SL LCH priority=1. The TX UE first compares category priority, and then for the same category, compares SL LCH priority. Since UE2 has the highest-priority SL LCH2 with SL LCH priority=2 in the first-priority category (Bj>0), UE2 is selected as the destination UE and the SL grant is allocated to SL LCHs of UE2, i.e. SL LCH1 and SL LCH2 of UE2. Note that that a lower LCH priority value corresponds to higher priority.

Figure 5:
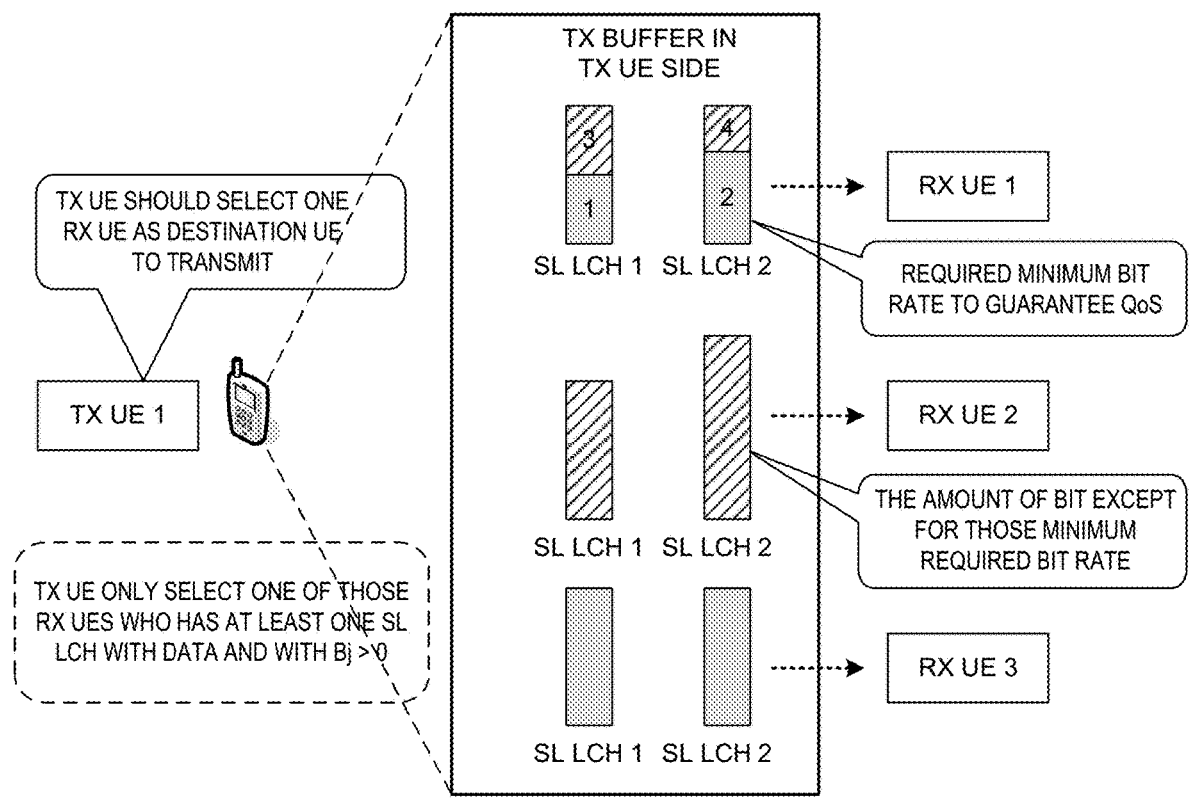
FIG. 5 illustrates a second embodiment of destination UE selection during LCP procedure in accordance with one novel aspect.

FIG. 5 illustrates a second embodiment of destination UE selection during LCP procedure in accordance with one novel aspect. In the example of FIG. 5, the TX UE maintains separate TX buffer for three RX UEs: UE1, UE2, and UE3. Each RX UE has two sidelink logical channels: SL LCH1 and SL LCH2. During the enhanced sidelink logical channel prioritization procedure, the TX UE should select one UE as destination UE to allocate SL resource for SL transmission. Accordingly, the TX UE prioritizes the RX UE whose associated SL LCH(s) are with Bj>0, i.e., prioritize those SL LCHs whose minimum required bit rates are not satisfied, regardless of the priority of the SL LCH with available data for SL transmission. As depicted in FIG. 5, both LCH1 and LCH2 of RX UE1 have Bj>0, e.g., not yet satisfied the minimum bit rate; both LCH1 and LCH2 of RX UE2 have Bj<0, e.g., the amount of bit except for those minimum required bit rate; and both LCH1 and LCH2 of RX UE3 have Bj>0, e.g., not yet satisfied the minimum bit rate. As a result, RX UE2 is excluded from being selected as the destination UE because RX UE2 has no SL LCH with Bj>0. RX UE1 and RX UE3 both have SL LCH with Bj>0 and therefore are considered for destination UE selection. The TX UE selects the UE having the highest priority SL LCH with Bj>0 among UE1 and UE3 as the destination UE. If UE1 and UE3 have the same highest priority SL LCH with Bj>0, then it is up to UE implementation which UE from UE1 and UE3 to be selected as the destination UE.

For example, if SL LCH1 and LCH2 toward RX UE1 are with SL LCH priority 1 and 2 respectively, and if SL LCH1 and LCH2 toward RX UE2 are with SL LCH priority 2 and 3 respectively, then the transmitter UE will select RX UE1 as the destination UE because RX UE1 has the highest-priority SL LCH with data available for transmission and with Bj>0. After deciding the destination UE, the transmitter UE then perform SL data multiplexing procedure to fill data of SL LCHs of the destination UE into the SL MAC PDU. In the first-round resource allocation, the transmitter UE allocate resource to satisfy Bj of SL LCH1 and SL LCH2 (in the decreasing order of SL LCH priority). Note that SL LCH 1 should be scheduled earlier than SL LCH 2 because SL LCH 1 has a higher SL LCH priority than SL LCH 2.

The resource to satisfy the prioritized bit rate requirement for SL LCH1 and SL LCH2 are illustrated as block 1 and block 2 in FIG. 5 respectively. After the first-round resource allocation, if there is remaining SL grant size to accommodate more SL data, the transmitter UE perform second-round resource allocation: starting from the highest-priority SL LCH of the selected destination UE (RX UE1), the transmitter UE allocate resource to each SL LCH (regardless of Bj value) in the decreasing order of SL LCH priority until each SL LCH has no remaining data or until the remaining SL grant size is exhausted. Block 3 and block 4 are the resource of SL LCH1 and SL LCH2 of the selected RX UE1 allocated in the second-round resource allocation. As a result, this SL MAC PDU is transmitted to RX UE1, and this MAC PDU includes data from SL LCH1 (i.e. the allocated resource (in bytes) are block 1 plus block 3) and data from SL LCH2 (i.e. the allocated resources (in bytes) are block 2 plus block 4).

Figure 6:
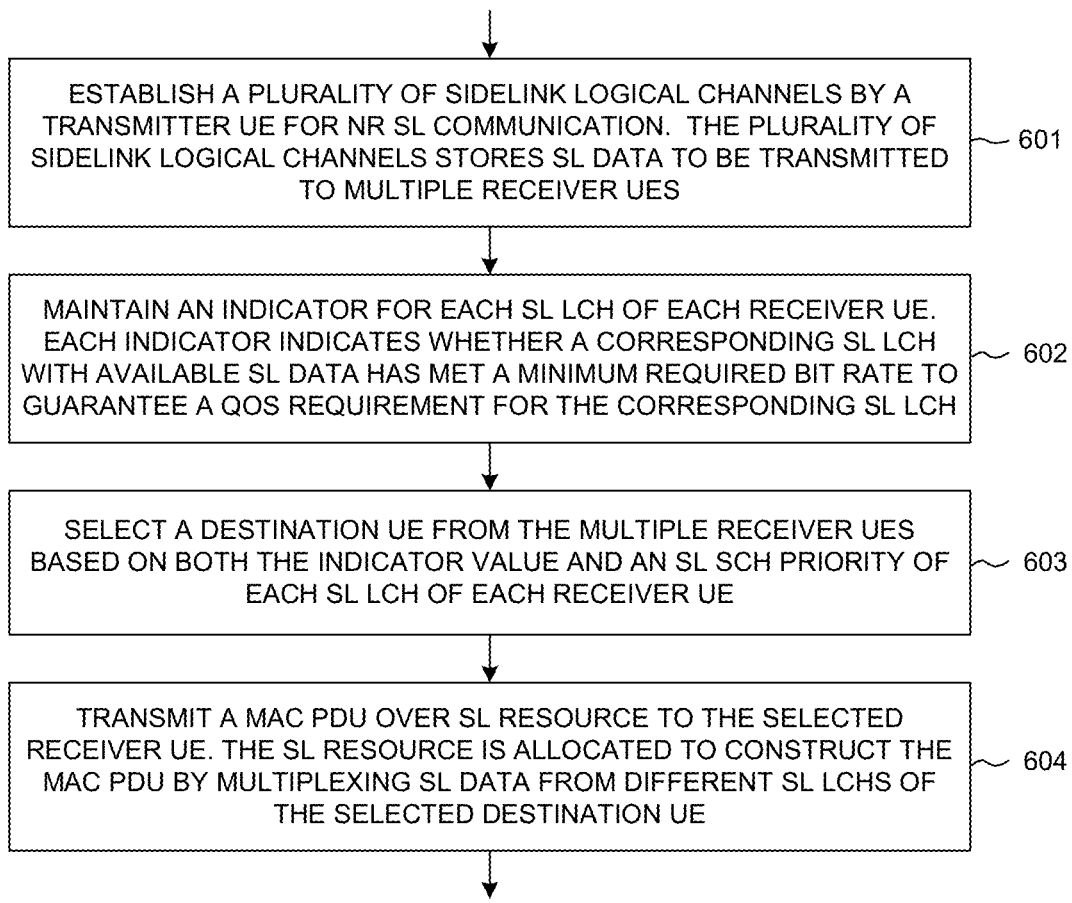
FIG. 6 is a flow chart of a method of logical channel prioritization (LCP) for sidelink in accordance with one novel aspect.

FIG. 6 is a flow chart of a method of logical channel prioritization (LCP) for sidelink in accordance with one novel aspect. In step 601, a transmitter user equipment (UE) establishes a plurality sidelink logical channels (SL LCHs) for new radio (NR) SL communication. The plurality of SL LCHs stores SL data to be transmitted to multiple receiver UEs. In step 602, the transmitter UE maintains an indicator for each SL LCH of each receiver UE. Each indicator indicates whether a corresponding SL LCH with available SL data has met a minimum required bit rate to guarantee a QoS requirement for the corresponding SL LCH. In step 603, the transmitter UE selects a destination UE from the multiple receiver UEs based on both the indicator value and an SL LCH priority of each SL LCH of each receiver UE. In step 604, the transmitter UE transmits a MAC PDU over SL resource to the selected destination UE. The SL resource is allocated to construct the MAC PDU by multiplexing SL data from different SL LCHs of the selected destination UE.

In one embodiment, the TX UE performs SL LCP for sidelink transmission as follows. The SL LCH with a Bj above threshold (e.g. positive Bj) is prioritized over a SL LCH with a Bj below threshold (e.g non-positive Bj). In one example, TX UE selects a destination UE with the highest-priority SL LCH with Bj>0 among all destination UEs. If no destination UE has SL LCH with data available for transmission and with Bj>0, TX UE selects the destination UE with high-priority SL LCHs with data available for transmission among all destination UEs. In another example, TX UE selects a destination UE with the highest-priority SL LCH among all destination UEs. If more than one destination UE has the highest-priority SL LCH with data available for transmission, TX UE selects a destination UE from these destination UEs having the highest-priority SL LCH and the highest-priority SL LCH is with Bj>0. If more than one destination UE has the highest-priority SL LCH with data available for transmission and with Bj>0, UE can further compare other metrics of these highest-priority SL LCH with data available for transmission and with Bj>0, e.g. latency requirement or the value of Bj, to determine the winner of the SL LCH and then the selected destination UE (i.e. the selected destination UE is associated with the winner SL LCH). If more than one destination UE has the highest-priority SL LCH with data available for transmission, but these highest-priority SL LCHs are all with Bj<0, UE can further compare other metrics of these highest-priority SL LCH with data available for transmission and with Bj>0, e.g. latency requirement or the value of Bj, to determine the winner of the SL LCH and the selected destination UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    establishing a plurality sidelink logical channels (SL LCHs) by a transmitter user equipment (UE) for new radio (NR) SL communication, wherein the plurality of SL LCHs stores SL data to be transmitted to multiple receiver UEs;
    maintaining an indicator value for each SL LCH of each receiver UE, wherein each indicator indicates whether a corresponding SL LCH with available SL data has met a minimum required bit rate to guarantee a Quality of Service (QoS) requirement for the corresponding SL LCH;
    selecting a destination UE from the multiple receiver UEs based on both the indicator value and an SL LCH priority of each SL LCH of each receiver UE; and
    transmitting a Media Access Control Protocol Data Unit (MAC PDU) over SL resource to the selected destination UE, wherein the SL resource is allocated to construct the MAC PDU by multiplexing SL data from different SL LCHs of the selected destination UE.

2. The method of claim 1, wherein a receiver UE having an SL LCH that has not met the minimum required bit rate is prioritized over other receiver UEs having no SL LCH that has not met the minimum required bit rate during the destination UE selection regardless of the corresponding SL LCH priorities.

3. The method of claim 1, wherein the maintaining of an indicator value of an SL LCH involves:
    increasing the indicator value by a prioritized bit rate (PBR) of the SL LCH times an elapsed time since a previous incrementation; and
    decreasing the indicator value by an amount of scheduled data for the SL LCH.

4. The method of claim 3, wherein the indicator value of the SL LCH is initialized to zero when the SL LCH is established, and wherein the indicator value has a maximum value equal to a bucket size of the SL LCH.

5. The method of claim 1, wherein a positive indicator value of an SL LCH indicates that the SL LCH has not met the minimum required bit rate, and wherein a negative indicator value of the SL LCH indicates that the SL LCH has met the minimum required bit rate.

6. The method of claim 5, wherein a UE having at least one SL LCH with a positive indicator value is prioritized over other UEs having no SL LCH with a positive indicator value.

7. The method of claim 5, wherein if multiple UEs having at least one SL LCH with a positive indicator value, then a UE that has an SL LCH with a positive indicator value and has a highest LCH priority is selected as the destination UE.

8. The method of claim 5, wherein if no UE having at least one SL LCH with a positive indicator value, then a UE that has an SL LCH having a highest LCH priority is selected as the destination UE.

9. The method of claim 1, wherein the SL resource is allocated to the different SL LCHs of the selected destination UE following a decreasing order of a corresponding SL LCH priority.

10. The method of claim 1, wherein an SL LCH is associated with a sidelink radio bearer that is mapped to one or more QoS flows that define the QoS requirement for the SL LCH.

11. A transmitter User Equipment (UE) comprising:
    a sidelink logical channel (SL LCH) handling circuit that establishes a plurality of SL LCHs for new radio (NR) SL communication, wherein the plurality of SL LCHs stores SL data to be transmitted to multiple receiver UEs;
    a control circuit that maintains an indicator for each SL LCH of each receiver UE, wherein each indicator indicates whether a corresponding SL LCH with available SL data has met a minimum required bit rate to guarantee a QoS Quality of Service (QoS) requirement for the corresponding SL LCH;
    a logical channel prioritization (LCP) circuit that selects a destination UE from the multiple receiver UEs based on both the indicator value and an SL LCH priority of each SL LCH of each receiver UE; and
    a transceiver that transmits a Media Access Control Protocol Data Unit (MAC PDU) over SL resource to the selected destination UE, wherein the SL resource is allocated to construct the MAC PDU by multiplexing SL data from different SL LCHs of the selected destination UE.

12. The transmitter UE of claim 11, wherein a receiver UE having an SL LCH that has not met the minimum required bit rate is prioritized over other receiver UEs having no SL LCH that has not met the minimum required bit rate during the destination UE selection regardless of the corresponding SL LCH priorities.

13. The transmitter UE of claim 11, wherein the control circuit maintains an indicator value of an SL LCH by increasing the indicator value by a prioritized bit rate (PBR) of the SL LCH times an elapsed time since a previous incrementation, and by decreasing the indicator value by an amount of scheduled data for the SL LCH.

14. The transmitter UE of claim 13, wherein the indicator value of the SL LCH is initialized to zero when the SL LCH is established, and wherein the indicator value has a maximum value equal to a bucket size of the SL LCH.

15. The transmitter UE of claim 11, wherein a positive indicator value of an SL LCH indicates that the SL LCH has not met the minimum required bit rate, and wherein a negative indicator value of the SL LCH indicates that the SL LCH has met the minimum required bit rate.

16. The transmitter UE of claim 15, wherein a UE having at least one SL LCH with a positive indicator value is prioritized over other UEs having no SL LCH with a positive indicator value.

17. The transmitter UE of claim 15, wherein if multiple UEs having at least one SL LCH with a positive indicator value, then a UE that has an SL LCH with a positive indicator value and has a highest LCH priority is selected as the destination UE.

18. The transmitter UE of claim 15, wherein if no UE having at least one SL LCH with a positive indicator value, then a UE that has an SL LCH having a highest LCH priority is selected as the destination UE.

19. The transmitter UE of claim 11, wherein the SL resource is allocated to the different SL LCHs of the selected destination UE following a decreasing order of a corresponding SL LCH priority.

20. The transmitter UE of claim 11, wherein an SL LCH is associated with a sidelink radio bearer that is mapped to one or more QoS flows that define the QoS requirement for the SL LCH.

* * * * *